United States Patent [19]

Verton

[11] Patent Number: 4,570,284
[45] Date of Patent: Feb. 18, 1986

[54] WIPER BLADE WITH AIR DEFLECTING DEVICE

[75] Inventor: José Verton, Saint-Vincent, Belgium

[73] Assignee: Champion Spark Plug Europe S.A., Virton, Belgium

[21] Appl. No.: 638,971

[22] Filed: Aug. 8, 1984

[51] Int. Cl.[4] ............................................. B60S 1/38
[52] U.S. Cl. ............................. 15/250.42; 15/250.36
[58] Field of Search ....................... 15/250.35–250.42, 15/250.2

[56] References Cited

U.S. PATENT DOCUMENTS

| | | | |
|---|---|---|---|
| 3,037,233 | 6/1962 | Peras et al. | 15/240.42 |
| 3,618,155 | 11/1971 | Mower | 15/240.42 |
| 3,862,465 | 1/1975 | Ito | 15/240.42 |
| 4,400,845 | 8/1983 | Noguchi et al. | 15/240.42 |
| 4,464,808 | 8/1984 | Berry | 15/240.42 |

Primary Examiner—Timothy F. Simone
Attorney, Agent, or Firm—Wood, Dalton, Phillips, Mason & Rowe

[57] ABSTRACT

A wiper blade for motor vehicles has a wiping element (6) attached to a superstructure which includes a main bridge (1), one or more intermediate yokes (2) and one or more secondary yokes (3), with at least one of the components (1,2,3) of said superstructure replaced by at least one air deflecting device (14). In a preferred form, at least one air deflecting device replaces at least one secondary yoke, with each air deflecting device (14) extending parallel to and at a certain distance from the wiping element (6) of the wiper blade. The air deflecting device or deflector (15) has attachment members (16,19,21) for securing the deflector to one of the components (2) of the superstructure of the wiper blade and has additional attachment members (17,4') for securing the deflector to the wiping element (6) of the wiper blade. The deflector has at least one resilient blade (18) capable of exerting a pressure on the wiping element (6) of the wiper blade. The invention results in a wiper blade having a ratio of the distance between the deflector (15) and the wiping element (6) and the distance between the bottom edge (15') of the deflector (15) and the surface to be wiped (12), which ratio is substantially equal to ten.

12 Claims, 16 Drawing Figures

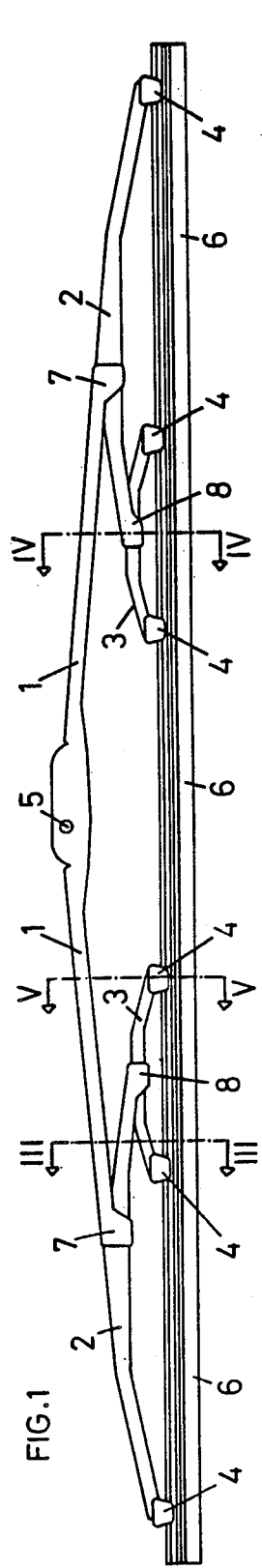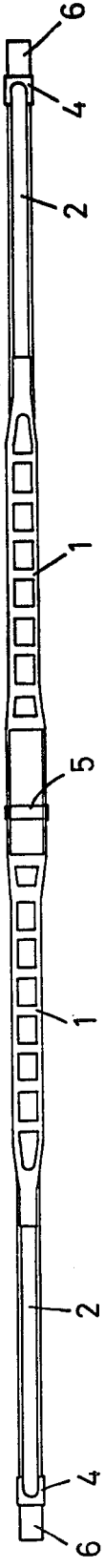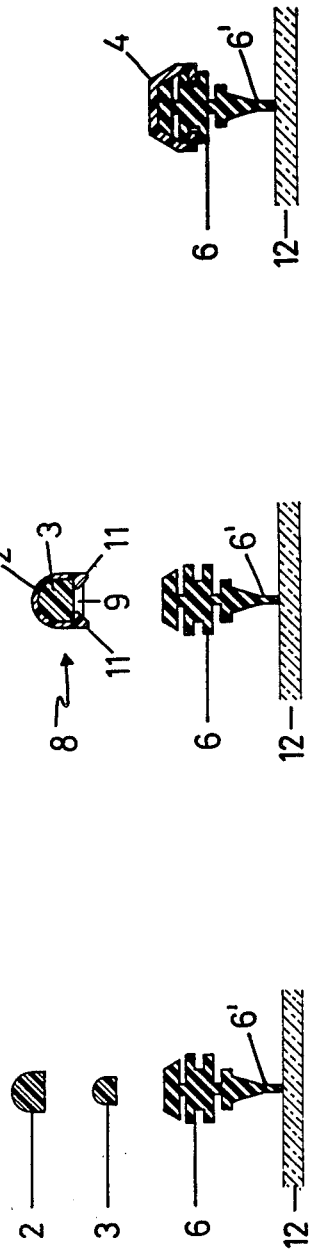

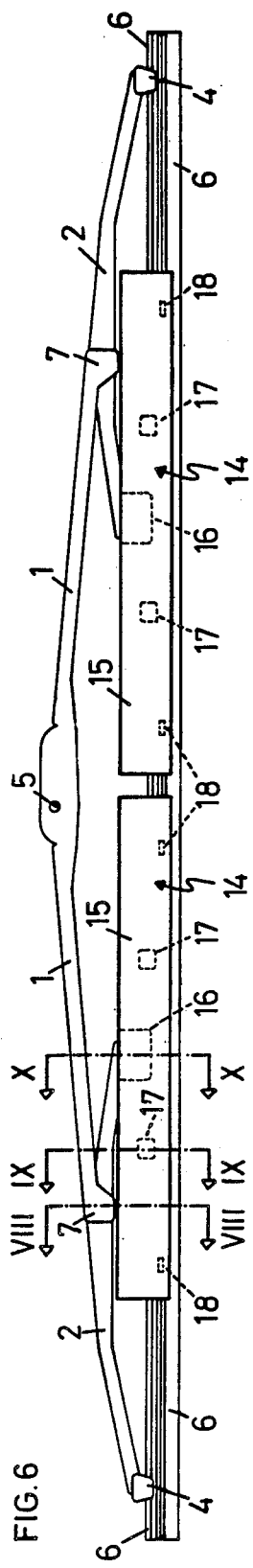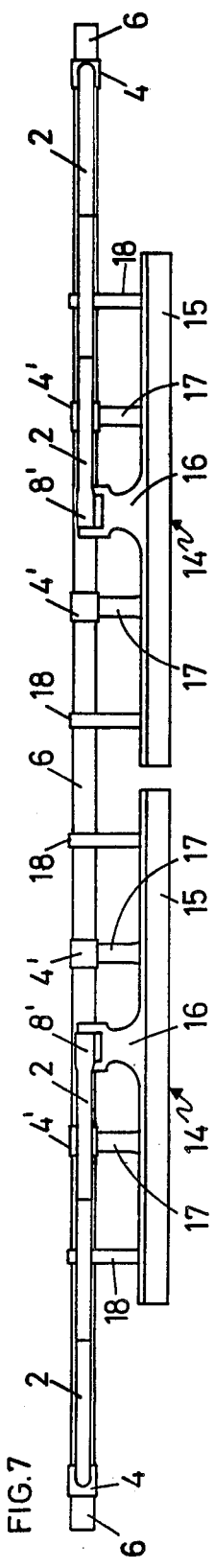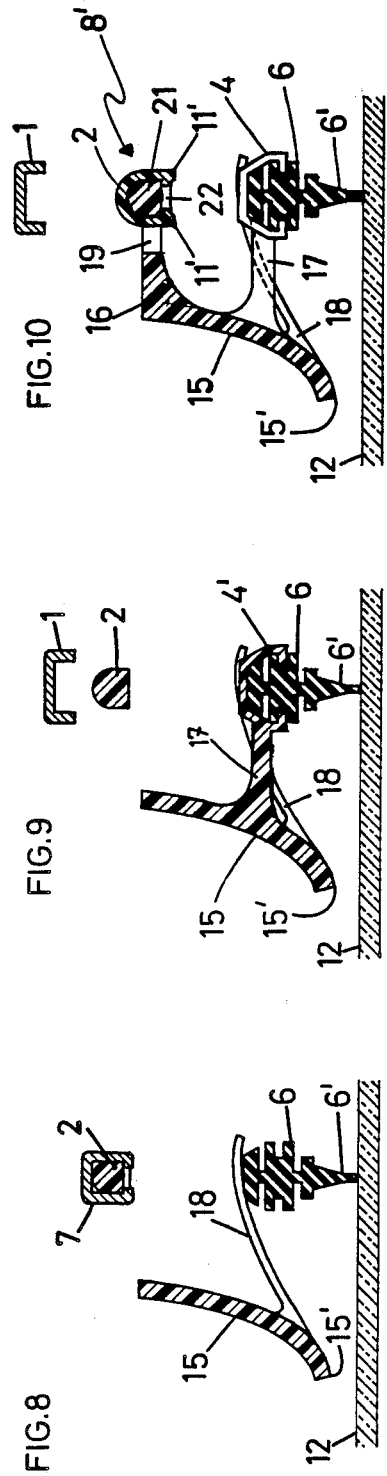

WIPER BLADE WITH AIR DEFLECTING DEVICE

DESCRIPTION

1. Technical Field

The present invention relates to a wiper blade for motor vehicles comprising a wiping element attached to a superstructure, which includes a main bridge, one or more intermediate yokes and one or more secondary yokes. The invention more particularly relates to a wiper blade of the above defined type having an air deflecting device.

2. Background of the Invention

Air deflecting devices in the wiper blade field are very well known in the prior art. They are generally attached, removably or not, either to the superstructure of the wiper blade or to the wiper arm which actuates the wiper blade. Among the known air deflecting devices which are attached to one of the components of the superstructure of the wiper blade, those disclosed in French Patent Publication No. 2,513,953 and in German (DE) Patent Publication No. 23 46 100 can be mentioned. In the first application the air deflecting device is attached to the main bridge of the superstructure of the wiper blade and in one embodiment of the second application the air deflecting device is attached to the secondary yokes of the superstructure of the wiper blade.

The problem which arises in all wiper blade systems designed for wiping the windshield of a motor vehicle, is the following: when the wiper blades are working and when the vehicle moves at a relatively high speed, the wiper blades have a tendency to lift, i.e. to move away from the windshield of the vehicle under the action of the air which flows on the windshield, thus rendering the visibility worse and worse as the speed of the vehicle increases.

In the thus defined phenomenon, three different stages may be distinguished as a function of the speed of the vehicle. During the first stage small wipe defects slowly appear on the windshield. These defects, even if not negligible, still allow the vehicle to be driven without taking too important risks. During the second stage, the wipe defects become more and more important and it becomes dangerous to drive the vehicle. The third stage corresponds to the moment where the wiping element moves away from the windshield. At this moment, the visibility becomes zero and the driver necessarily has to reduce the speed of the vehicle.

Tests executed on vehicles placed in a wind tunnel have shown that the beginning of each of the three above mentioned stages can be displaced towards higher vehicle speeds in using air deflecting devices attached to one or the other of the components of the superstructure of the wiper blade.

Said same tests also have shown that, just at the beginning of the first above mentioned stage, the lower lip of the wiping element, i.e. the lip which normally should be in permanent contact with the windshield, starts to flutter and to vibrate. Thus, at this moment, said lip of the wiping element is no longer in permanent contact with the windshield and the first wipe defects appear.

It is important to note that said flutters and vibrations of the lower lip of the wiping element only appear between two successive supporting points of the superstructure of the wiper blade. In other words, said lip of the wiping element does not flutter or vibrate beneath the supporting points of the superstructure of the wiper blade. It is to be understood that the supporting points of the superstructure are all those points where one of the components of the superstructure is attached to the wiping element.

Since the more the supporting points of the superstructure are distant one from the other, the earlier (i.e. as the speed of the vehicle is lower) the flutters and vibrations appear, the way to proceed is either to reduce the distance between two successive supporting points, or to create supplementary supporting points. It is this last solution which has been applied in the present invention.

The tests in the wind tunnel have, moreover, shown that in order to guarantee the maximum efficiency, independently of the above mentioned supplementary supporting points, an air deflecting device attached to one of the components of the superstructure of a wiper blade must comply with the following conditions:

1. The properly so called deflector (as opposed to the attachment means of the air deflecting device) must extend parallel, and at a certain non-negligible distance from the wiping element of the wiper blade.
2. The structure of the air deflecting device must be such that the air can circulate between the properly so called deflector and the assembly superstructure/wiping element of the wiper blade.
3. The ratio of (a) the distance between the properly so called deflector and the wiping element and (b) the distance between the lower edge of the properly so called deflector and the surface to be wiped must substantially be equal to ten.

In none of the two above mentioned patent applications is there disclosed a wiper blade provided with an air deflecting device which complies with all the conditions for obtaining the best results and consequently the embodiments described in said applications solve the problem only very imperfectly.

THE INVENTION

The main characteristic of the wiper blade according to the invention is the fact that one or more of the components of the superstructure of the wiper blade are replaced by one or more air deflecting devices. In taking into consideration the above mentioned conditions, this solution has the advantage of diminishing the number and/or the complexity of the parts needed for obtaining a maximum positive effect.

The object of the present invention is to provide a wiper blade comprising an air deflecting device which not only complies with the three above mentioned conditions, but also is provided with means for eliminating, or at least for diminishing, the negative effects of the flutters and vibrations of the lower lip of the wiping element at the beginning of the first above defined stage.

As to the efficiency of the wiper blade according to the invention, the following figures can be mentioned:

(a) As compared to an equivalent known wiper blade provided with an air deflecting device: gain of ±15 km/h before the first wipe defects appear.

(b) As compared to an equivalent known wiper blade which is not provided with an air deflecting device: gain of ±35 km/h before the first wipe defects appear.

Other characteristics of the invention will be better understood when reading the following portions of the description in conjunction with the drawings.

DESCRIPTION OF THE DRAWINGS

FIG. 1 is an elevational view of a known wiper blade not provided with an air deflecting device;

FIG. 2 is a top view of the wiper blade of FIG. 1;

FIG. 3 is a schematic section, at a larger scale, along line III—III of FIG. 1;

FIG. 4 is a schematic section, at a larger scale, along line IV—IV of FIG. 1;

FIG. 5 is a schematic section, at a larger scale, along line V—V of FIG. 1;

FIG. 6 is an elevational view of the same wiper blade as the one of FIG. 1, but provided with two air deflecting devices according to the invention;

FIG. 7 is a top view of the wiper blade of FIG. 6 wherein the main bridge of said wiper blade is not represented;

FIG. 8 is a schematic section, at a larger scale, along line VIII—VIII of FIG. 6;

FIG. 9 is a schematic section, at a larger scale, along line IX—IX of FIG. 6;

FIG. 10 is a schematic section, at a larger scale, along line X—X of FIG. 6;

DESCRIPTION OF THE PREFERRED EMBODIMENT

Figure 11:
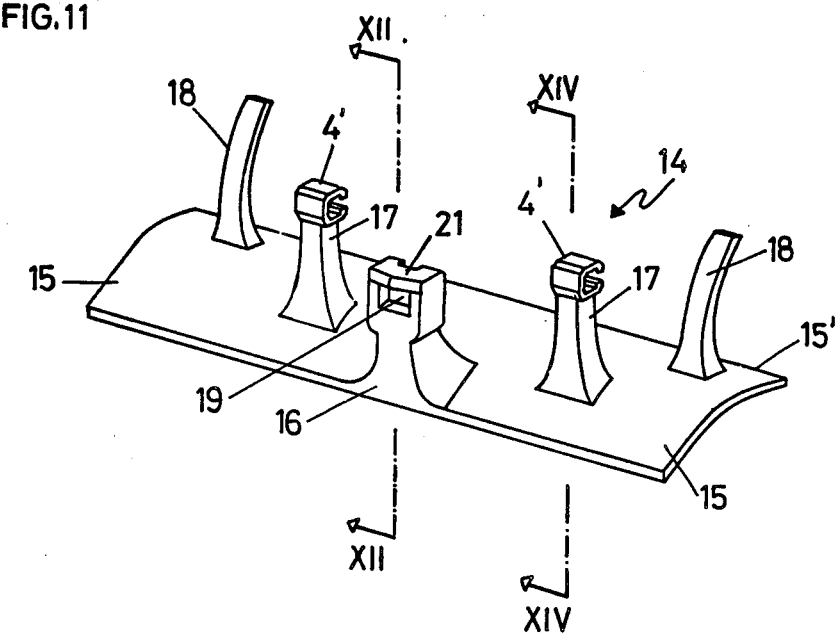
FIG. 11 is a perspective view of an air deflecting device according to the invention.

FIGS. 1 through 5 show, for example, a known type of wiper blade which can be provided with an air deflecting device according to the invention. This wiper blade comprises the following components or elements: a main bridge 1, two intermediate bridges or yokes 2, two secondary yokes 3, and a wiping element 6 which is attached to the intermediate bridges or yokes 2 and to the secondary yokes 3 by means of the claws 4. The pressure of the wiper arm (not represented) is transferred to the wiping element 6 via the rivet 5 and via the components 1,2,3 of the superstructure. The components 1,2,3 are linked together via the articulations 7,8.

Figure 13:
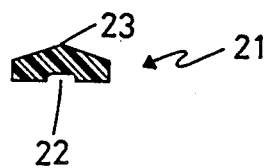
FIG. 13 is a section along line XIII—XIII of FIG. 12.

In this example of a wiper blade, the main bridge 1 is made of steel while the intermediate yokes 2 and the secondary yokes 3 are made of an appropriate plastic material. The articulation 8 which, as will be seen hereunder, is of some importance in the present invention, is realized (FIG. 4) by snapping the hooks 11 of the intermediate yokes 2 into the recess 9 of the secondary yokes 3. In a longitudinal section the portion of the secondary yokes 3 which comprises the articulation has a configuration which is identical to the one of FIG. 13, i.e. that at its upper center portion it is provided with an edge which allows the secondary yokes 3 to rock with respect to the intermediate yokes 2.

FIGS. 6 through 10 show a wiper blade according to the invention, i.e. provided with the air deflecting devices 14. One of the air deflecting devices 14 is shown in a perspective view in FIG. 11 and in sections in FIGS. 12 through 14. In FIGS. 11 through 14 the air deflecting device is shown such as it is before assembly, i.e. when it is not submitted to any constraint.

The wiper blade of FIG. 6 is exactly the same as the one of FIG. 1, except that the two secondary yokes 3 (FIG. 1) have been replaced by the two air deflecting devices 14 (FIG. 6). The air deflecting devices according to the invention thus assume at least two functions:

(1) They prevent the air from hitting the lower lip 6' of the wiping element 6 directly.
(2) They take over the function of the secondary yokes 3, i.e. the transfer on the wiping element 6 of the pressure exerted by the wiper arm (not represented) on the rivet 5.

In fact, the air deflecting devices according to the invention have a third function, as explained hereunder, which is to ensure a better pressure distribution along the wiping element 6.

In order to assume the two first functions, each air deflecting device 14 (FIG. 11) comprises (a) a properly so called deflector 15 and (b) attachment means 16,19,21 for the attachment to the corresponding intermediate yoke 2 and attachment means 17,4' for the attachment to the wiping element 6 of the wiper blade. The attachment means 16,19,21,17,4' have a configuration such that when the air deflecting device 14 is mounted on the wiper blade, the properly so called deflector 15 extends parallel and at a certain non-negligible distance from the wiping element 6 of the wiper blade (FIG. 7).

The attachment means for securing the air deflecting device 14 to one of the intermediate yokes 2 are based on the same principle as the one used for securing the secondary yokes 3 to the intermediate yokes 2, i.e. the articulations of FIGS. 7 and 10 work in the same manner as the articulations 8' of FIGS. 1 and 4.

The articulation 8' thus comprises (a) on the intermediate yokes, the hooks 11 and (b) on the attachment means 16,19,21 of the air deflecting device 14, the portion of part 21 (FIGS. 11 through 14) which is provided, at its upper center portion, with an edge 23 and at its lower portion with a groove 22, into which groove the hooks 11' of the intermediate yoke 2 snap, one of said hooks 11' first passing through the opening 19 provided in the attachment means 16,19,21.

The attachment means for securing the air deflecting device 14 to the wiping element 6 comprise the claws 4' (FIG. 11) which are identical to the claws 4 (FIG. 5) of the known wiper blade of FIG. 1. In both cases the claws 4,4' thus work in the same manner.

The third function which the air deflecting device according to the invention must assume is, as already said above, to improve the pressure distribution along the wiping element 6. This is obtained by supplementary supporting points on both sides of the claws 4' of each air deflecting device 14.

Figure 12:
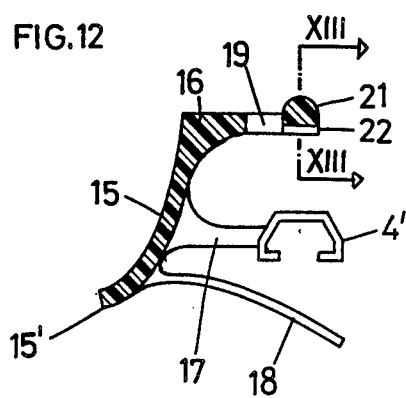
FIG. 12 is a schematic section, at a larger scale, along line XII—XII of FIG. 11.
Figure 14:
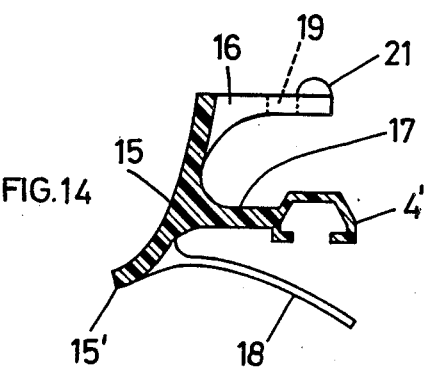
FIG. 14 is a schematic section, at a larger scale, along line XIV—XIV of FIG. 11.

For this purpose the air deflecting devices 14 are provided with resilient blades 18 which, when the air deflecting devices are mounted on the wiper blade, are under stress and develop a downwardly directed force acting on the top surface of the wiping element 6 of the wiper blade. FIGS. 8 through 10 show said resilient blades 18 after assembly, while FIGS. 12 and 14 show the same blades before assembly.

Figure 15:
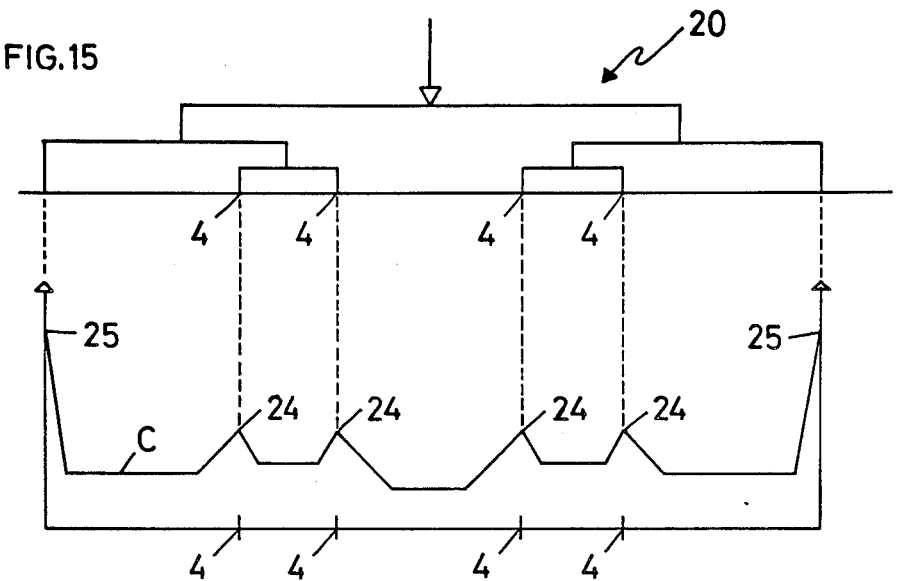
FIG. 15 schematically represents the wiper blade of FIG. 1 and the corresponding diagram of the pressure distribution on the wiping element.
Figure 16:
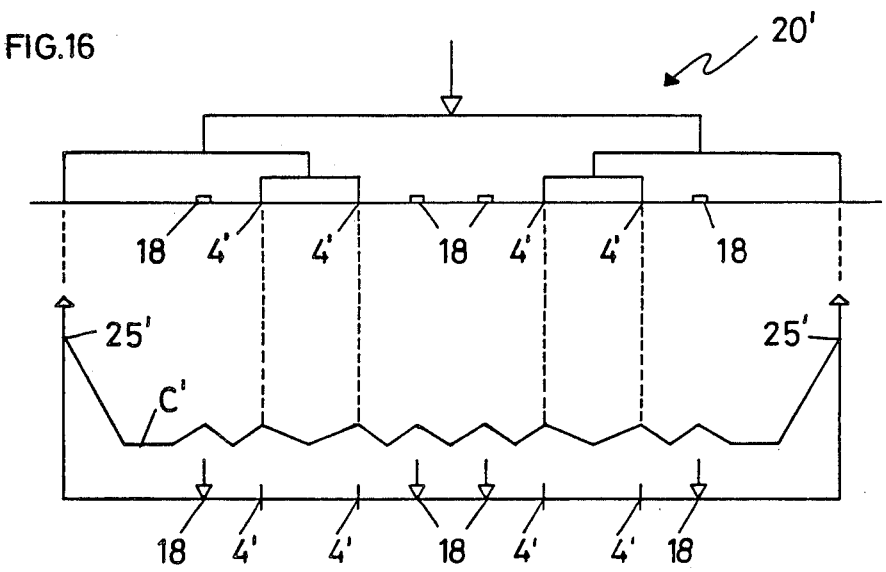
FIG. 16 schematically represents the wiper blade according to the invention and the corresponding diagram of the pressure distribution on the wiping element.

The effect of the resilient blades 18 on the pressure distribution along the wiping element 6 is shown on FIGS. 15 and 16. FIG. 15 schematically shows a wiper blade 20 identical to the one of FIG. 1 as well as the corresponding pressure distribution diagram C and FIG. 16 schematically shows a wiper blade 20' identical to the one of FIG. 6, also with the corresponding pressure distribution diagram C'.

In FIG. 15 it can be seen that in the case of the wiper blade 20, the pressure distribution diagram C shows two important pressure peaks 25 at the two extremities of the wiping element and four smaller pressure peaks 24 at the intermediate supporting points 4.

In FIG. 16, i.e. in the case of a wiper blade according to the invention, the pressure distribution diagram C' has a substantially different configuration, at least in not taking into consideration the pressure peaks 25' at the two extremities of the wiping element. Indeed, because of the supplementary supporting points 18 (resilient blades of the air deflecting devices 14) the pressure is more uniformly distributed than in the case of FIG. 15. In fact, the pressure has been increased in the area of the blades 18 and has been diminished in the area of the intermediate supporting points 4'.

It is the increase of the pressure in the area of the resilient blades 18 which diminishes the tendency of the lower lip 6' of the wiping element 6 to flutter and vibrate, thus improving the efficiency of the wiper blade according to the invention as to wipe defects at high speed.

As already mentioned in the introductory portion of the present specification, the best results are obtained if the ratio between (a) the distance between the properly so called deflector 15 and the wiping element 6 and (b) the distance between the lower edge 15' of said properly so called deflector 15 and the surface to be wiped is substantially equal to ten.

One embodiment of a new invention has thus been described, but it is quite evident that the invention is not limited to this embodiment. Indeed, modifications and/or changes may be made without departing from the scope of the invention such as defined in the appended claims.

We claim:

1. A wiper blade for motor vehicles or the like which includes a wiping element attached to a superstructure for transmitting pressure from a wiper arm to the wiping element, the superstructure comprising:
    an elongated main bridge;
    at least one intermediate yoke;
    articulated means for attaching the intermediate yoke to the main bridge;
    at least one air deflecting device attached to the wiping element; and
    articulated means for attaching the air deflecting device to the intermediate yoke.

2. The wiper blade of claim 1, including two said air deflecting devices each attached to the wiping element at at least two points.

3. The wiper blade of either claims 1 or 2 wherein the deflecting device includes at least one biasing member for exerting pressure on the wiping element at a point spaced from the point of attachment between the deflecting device and the wiping element.

4. The wiper blade of claim 3 wherein said biasing member is resilient and self-biased against the wiping element.

5. The wiper blade of claim 1 wherein said air deflecting device is fabricated of plastic.

6. The wiper blade of claim 1 wherein said air deflecting device includes a deflector element extending parallel to and spaced from the wiping element.

7. The wiper blade of claim 6 wherein the ratio between (a) the distance between the deflector element and the wiping element and (b) the distance between a bottom edge of the deflector element and the surface to be wiped is substantially equal to ten.

8. A wiper blade for motor vehicles or the like which include a wiping element attached to a superstructure for transmitting pressure from a wiper arm to the wiping element, the superstructure comprising:
    an elongated main bridge;
    a pair of intermediate yokes;
    articulated means for attaching said pair of intermediate yokes to the distal ends of the main bridge;
    a pair of air deflecting devices attached to the wiping element at at least two attachment points, each air deflecting device including a deflector element extending parallel to and spaced from the wiping element; and
    articulated means for attaching each air deflecting device to a respective one of said intermediate yokes.

9. The wiper blade of claim 8 wherein each deflecting device includes at least a pair of biasing members for exerting pressure on the wiping element at points spaced outwardly from the attachment points between the deflecting device and the wiping element.

10. The wiper blade of claim 9 wherein each said biasing member is resilient and self-biased against the wiping element.

11. The wiper blade of claim 8 wherein each said air deflecting device is fabricated of plastic.

12. The wiper blade of claim 8 wherein the ratio between (a) the distance between each said deflector element and the wiping element and (b) the distance between the bottom edge of each said deflector element and the surface to be wiped is substantially equal to ten.

* * * * *